975X
No Printed Specification Available
P. Upham,
Water Elevator,
Patented Jan. 6, 1809.
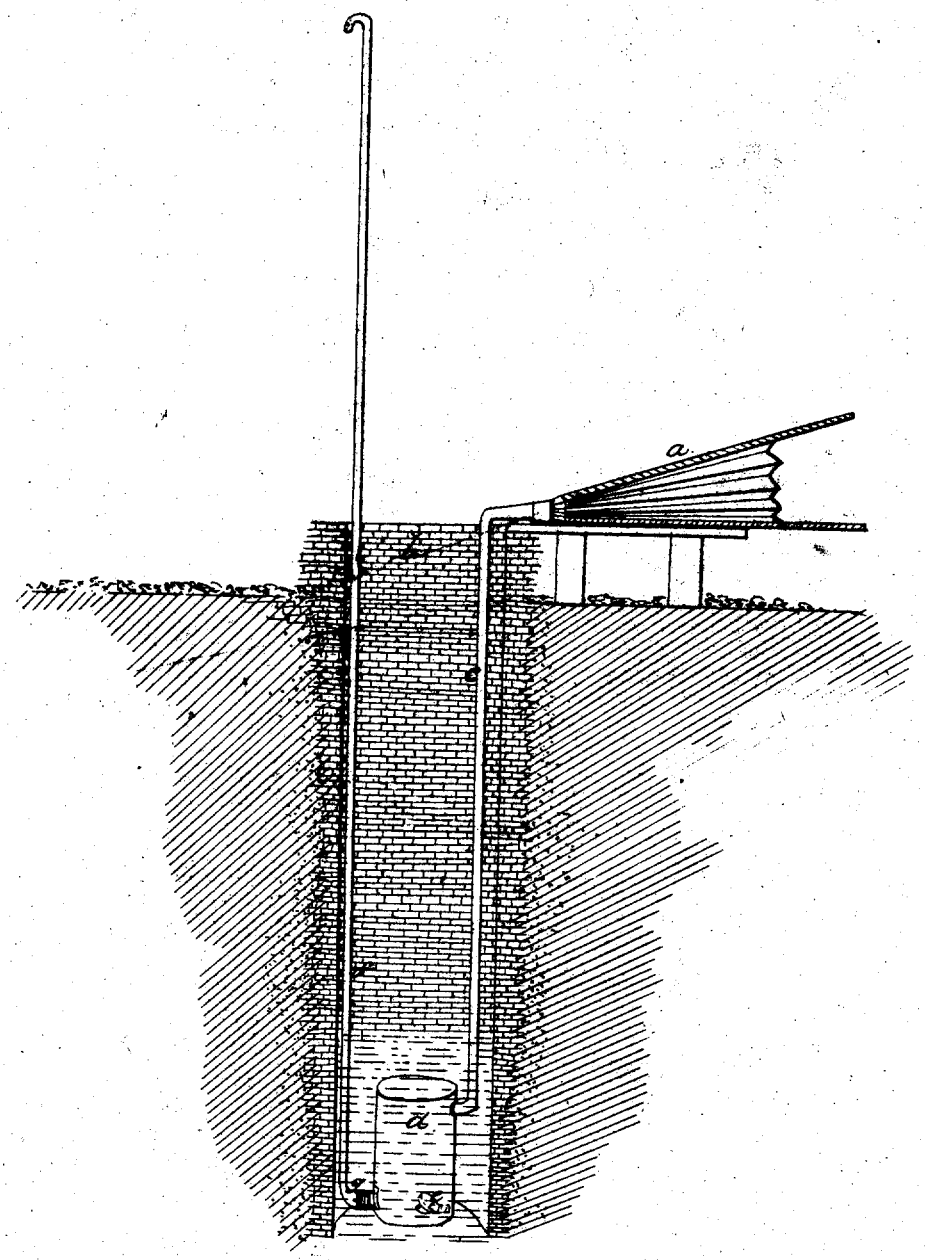

[illegible]

Pliny Upham. 975X

Letters Patent.

The Schedule referred to in these Letters Patent and making part of the same, containing a description in the words of the said Pliny Upham, himself of his Pneumatic forcing pump A Bellows of such form as may be found most convenient, is to be placed over the well or other depth from whence water is to be raised; from the bottom of which bellows, in a manner similar to the common operation of that instrument, the air is forced through a tube into a barrel or small reservoir of a cylindrical or any other convenient form. The said barrel being wholly immersed in the water to be raised, the water enters and fills it thro a valve in the bottom thereof & is prevented from escaping by the closing of the valve. The air being thus forced as above stated, the water in said barrel is thereby propelled thro an aperture in the side and contiguous to the bottom thereof into a tube which rises from thence vertically to the height required, another valve in the last mentioned tube near the bottom thereof prevents the water from returning into the barrel. By the consequent pressure of air, occasioned by the successive action & reaction of the aforesaid bellows a constant current of water is made to issue from the upper end of the discharging, or last mentioned tube. To effect the above described motion of the bellows any convenient power may be applied, but it is thought that a rack & pinion applying with more or less force to the top of the bellows, so as to raise it, having sufficient weight incumbent thereon to cause it to descend will be the most suitable contrivance.

Witnesses
Sophiah Dwight Foster
Dwight Foster
302 words

Pliny Upham

Exd.
W.F.